United States Patent
Bates

(10) Patent No.: US 9,262,302 B2
(45) Date of Patent: Feb. 16, 2016

(54) DISPLAYING VALUES OF VARIABLES IN A FIRST THREAD MODIFIED BY ANOTHER THREAD

(75) Inventor: Cary L. Bates, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 710 days.

(21) Appl. No.: 12/969,766

(22) Filed: Dec. 16, 2010

(65) Prior Publication Data

US 2012/0159117 A1    Jun. 21, 2012

(51) Int. Cl.
G06F 11/36    (2006.01)

(52) U.S. Cl.
CPC .................. *G06F 11/3636* (2013.01)

(58) Field of Classification Search
CPC ..... G06F 13/102; G06F 1/165; G06F 9/4825; G06F 11/362; G06F 11/3636
USPC ............ 717/124, 125, 126, 127, 129; 714/34, 714/35
See application file for complete search history.

(56) References Cited

U.S. PATENT DOCUMENTS

| | | | |
|---|---|---|---|
| 5,175,856 A * | 12/1992 | Van Dyke et al. ............ 717/151 |
| 5,956,479 A * | 9/1999 | McInerney et al. ........ 714/38.13 |
| 6,263,488 B1 * | 7/2001 | Fortin et al. ................... 717/127 |
| 6,378,125 B1 * | 4/2002 | Bates et al. .................... 717/129 |
| 6,480,818 B1 * | 11/2002 | Alverson et al. ................ 703/26 |
| 6,516,460 B1 | 2/2003 | Merks et al. |
| 6,634,020 B1 * | 10/2003 | Bates et al. .................... 717/131 |
| 6,754,856 B2 * | 6/2004 | Cofler et al. ..................... 714/53 |
| 6,766,519 B1 * | 7/2004 | Burriss et al. ................. 719/321 |
| 7,296,259 B2 | 11/2007 | Betker et al. |
| 8,161,461 B2 * | 4/2012 | Delmonte et al. ............ 717/127 |
| 2002/0073400 A1 * | 6/2002 | Beuten et al. ................. 717/127 |
| 2003/0004671 A1 * | 1/2003 | Minematsu ................... 702/123 |
| 2003/0221186 A1 * | 11/2003 | Bates et al. .................... 717/125 |
| 2004/0049712 A1 | 3/2004 | Betker et al. |
| 2004/0139305 A1 * | 7/2004 | Arimilli et al. ............... 712/227 |
| 2006/0037004 A1 * | 2/2006 | Long et al. .................... 717/127 |
| 2006/0136919 A1 * | 6/2006 | Aingaran et al. ............. 718/100 |
| 2006/0282707 A1 * | 12/2006 | Rosenbluth et al. ............ 714/38 |
| 2007/0079292 A1 * | 4/2007 | Chen et al. .................... 717/127 |
| 2008/0133977 A1 | 6/2008 | Chun et al. |
| 2009/0037888 A1 * | 2/2009 | Tatsuoka et al. .............. 717/135 |

* cited by examiner

*Primary Examiner* — Chat Do
*Assistant Examiner* — Sergio J Curbelo, III
(74) *Attorney, Agent, or Firm* — Owen J. Gamon; Roy W. Truelson

(57) ABSTRACT

In an embodiment, an address watch is established on a memory address while the execution of a first thread of a program is halted. In response to a second thread modifying memory contents at the memory address, encountering the address watch and halting, a determination is made whether a first variable in the program that represents the memory address is displayed on a user interface for the first thread. If the first variable in the program that represents the memory address is displayed on the user interface for the first thread, the value of the first variable is read and displayed on the user interface of the first thread.

16 Claims, 5 Drawing Sheets

PROGRAM (152)

202  208
X = R + 1

204            210
Y = SUBSTRING(1,4,Q)

ADDRESS WATCH TABLE (158)

| THREAD ID OF HALTED THREAD THAT SET ADDRESS WATCH (310) | VARIABLE (312) | ADDRESS WATCHED (314) | |
|---|---|---|---|
| THREAD A | X | 00FF | 302 |
| THREAD A | Y | 0104 | 304 |
| THREAD A | Z | FEE9 | 306 |

FIG. 3

DISPLAYING VALUES OF VARIABLES IN A FIRST THREAD MODIFIED BY ANOTHER THREAD

FIELD

An embodiment of the invention generally relates to computer systems and more particularly to address watches of variables in multiple threads of a program.

BACKGROUND

Computer systems typically comprise a combination of computer programs and hardware, such as semiconductors, transistors, chips, circuit boards, storage devices, and processors. The computer programs are stored in the storage devices and are executed by the processors. As the sophistication and complexity of computer programs increase, the programs become more difficult to debug. Bugs are problems, faults, or errors in a computer program. Locating, analyzing, and correcting suspected faults in a computer program is a process known as "debugging." Typically, a programmer uses another computer program commonly known as a debugger or a debug engine to debug the program under development.

Conventional debug engines typically support three primary types of operations, which a computer programmer may request via a user interface. A first type is a breakpoint or address watch operation, which permits a programmer to identify with a breakpoint a precise instruction at which to halt execution of the program by the processor, or identify via an address watch, a memory location for the processor to monitor for content modification, at which time the program's execution is halted. As a result, when a program is executed by the debug engine, the program executes on the processor in a normal fashion until the breakpoint is reached or the contents of the monitored memory location are written to, at which time the debug engine halts execution of the program. A second type is a step operation, which permits a computer programmer to cause the processor to execute instructions in a program either one-by-one or in groups. After each instruction or group of instructions are executed, the debug engine then halts execution of the program. Once the execution of the program is halted, either by step or breakpoint operations, conventional debug engines provide a third type of operation, which displays the content that is stored at various storage locations, in response to requests by the programmer. By this debugging process of halting the program at various instructions and examining the content of various storage locations, the programmer might eventually find the storage location whose stored content, such as an instruction or data, is incorrect or unexpected.

SUMMARY

A method, computer-readable storage medium, and computer system are provided. In an embodiment, an address watch is established on a memory address while the execution of a first thread of a program is halted. In response to a second thread modifying memory contents at the memory address, encountering the address watch and halting, a determination is made whether a first variable in the program that represents the memory address is displayed on a user interface for the first thread. If the first variable in the program that represents the memory address is displayed on the user interface for the first thread, the value of the first variable is read and displayed on the user interface of the first thread.

BRIEF DESCRIPTION OF THE SEVERAL VIEWS OF THE DRAWINGS

FIG. 2 depicts a block diagram of an example program, according to an embodiment of the invention.

FIG. 3 depicts a block diagram of an example data structure for an address watch table, according to an embodiment of the invention.

It is to be noted, however, that the appended drawings illustrate only example embodiments of the invention, and are therefore not considered a limitation of the scope of other embodiments of the invention.

DETAILED DESCRIPTION

Figure 1:
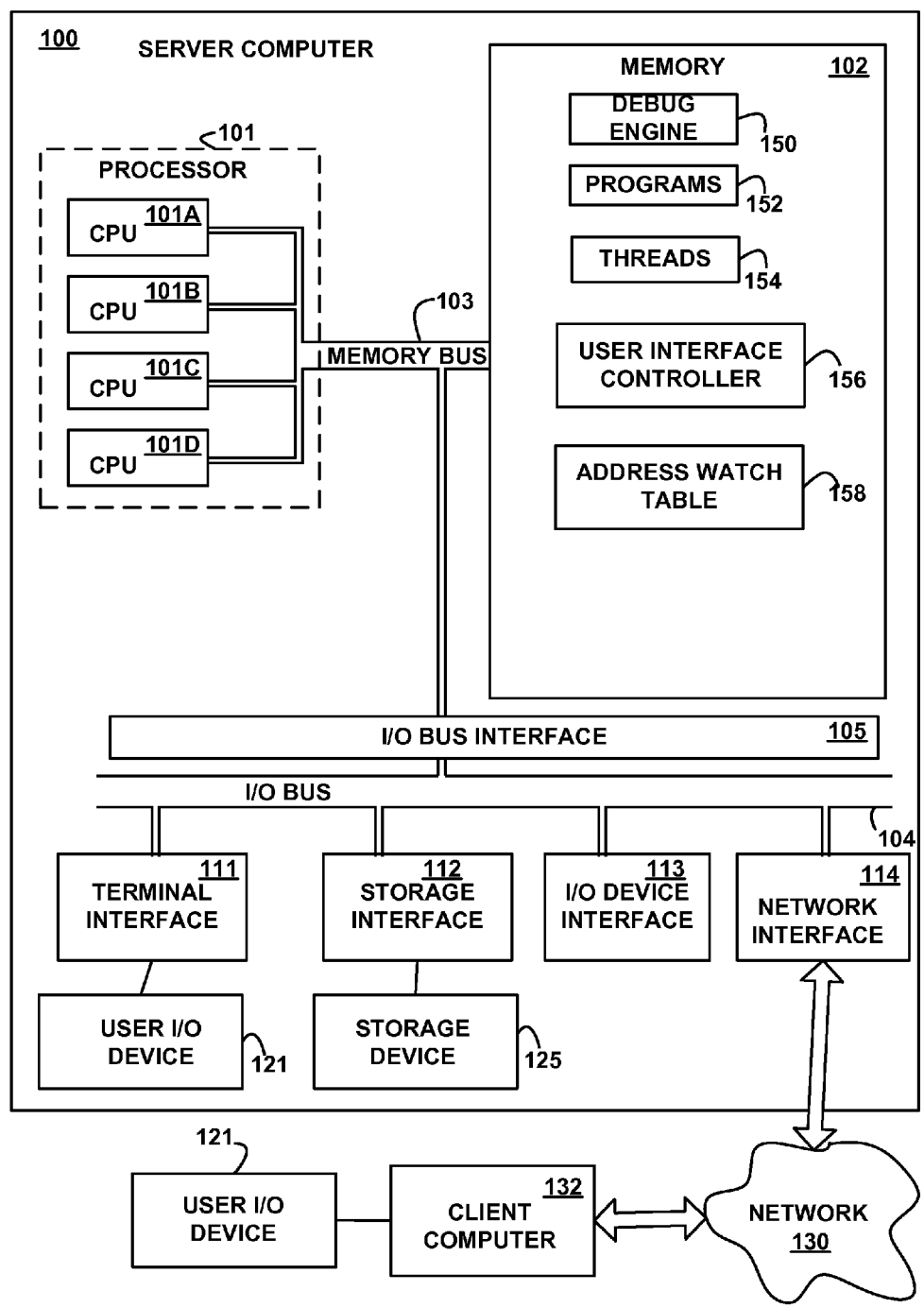
FIG. 1 depicts a high-level block diagram of an example system for implementing an embodiment of the invention.

Referring to the Drawings, wherein like numbers denote like parts throughout the several views, FIG. 1 depicts a high-level block diagram representation of a server computer system 100 connected to a client computer system 132 via a network 130, according to an embodiment of the present invention. The term "server" is used herein for convenience only, and in various embodiments a computer system that operates as a client computer in one environment may operate as a server computer in another environment, and vice versa. The mechanisms and apparatus of embodiments of the present invention apply equally to any appropriate computing system.

The major components of the computer system 100 comprise one or more processors 101, a main memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may comprise one or more levels of on-board cache.

In an embodiment, the main memory 102 may comprise a random-access semiconductor memory, storage device, or storage medium for storing or encoding data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 is encoded with or stores a debug engine 150, programs 152, threads 154, a user interface controller 156, and an address watch table 158. Although the debug engine 150, the programs 152, the threads 154, the user interface controller 156, and the address watch table 158 are illustrated as being contained within the memory 102, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, the debug engine 150, the programs 152, the threads 154, the user interface controller 156, and the address watch table 158 are not necessarily all completely contained in the same storage device at the same time. Further, although the debug engine 150, the programs 152, the threads 154, the user interface controller 156, and the address watch table 158 are illustrated as being separate entities, in other embodiments some of them, portions of some of them, or all of them may be packaged together.

In an embodiment, the debug engine 150, the programs 152, the threads 154, and/or the user interface controller 156 comprise instructions or statements that execute on the processor 101 or instructions or statements that are interpreted by instructions or statements that execute on the processor 101, to carry out the functions as further described below with reference to FIGS. 2, 3, 4, 5, and 6. In another embodiment, the debug engine 150, the programs 152, the threads 154, and/or the user interface controller 156, are implemented in hardware via semiconductor devices, chips, logical gates, circuits, circuit cards, and/or other physical hardware devices in lieu of, or in addition to, a processor-based system. In an embodiment, the debug engine 150, the programs 152, the threads 154, and/or the user interface controller 156 comprise data in addition to instructions or statements.

The program 152 is debugged via the debug engine 150. The program 152 may be any type of executable or interpretable code or statements, whether in source or object form. In various embodiments, the program 152 may be an application program, an operating system program, a network application program, an application server program, a server program, a grid program, a scientific calculation manager, a query optimizer, or any other type of program.

In various embodiment, the threads 154, which may also be known as processes or tasks, comprise instances of the same program 152, executing concurrently, simultaneously, or substantially simultaneously on the same or different processors via parallel computing, multi-tasking, or multiprocessing techniques. On a single processor, multithreading occurs by time-division multiplexing, as the single processor switches between different threads 154. This context switching occurs frequently enough that the user perceives the threads 154 as executing simultaneously. On a multiprocessor or multi-core computer system, the threads 154 actually execute simultaneously, with each processor or core executing a particular thread 154. In an embodiment, the threads 154 share resources, such as memory and/or a processor, but in other embodiment the threads 154 do not share resources. In an embodiment, all of the threads 154 comprise identical code, which are identical copies of the program 152. In another embodiment, some or all of the threads 154 comprise portions or subsets of the program 152, and the subsets may or may not overlap with each other.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104.

The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the computer system 100, and may receive output data via the user output devices. For example, a user interface may be presented via the user I/O device 121, such as displayed on a display device, played via a speaker, or printed via a printer.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the main memory 102, or any portion thereof, may be stored to and retrieved from the storage device 125, as needed. The I/O device interface 113 provides an interface to any of various other input/output devices or devices of other types, such as printers or fax machines. The network adapter 114 provides one or more communications paths from the computer system 100 to other digital devices and computer systems 132; such paths may comprise, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the computer system 100 and the computer system 132. In various embodiments, the network 130 may represent a storage device or a combination of storage devices, either connected directly or indirectly to the computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

The client computer 132 may comprise some or all of the hardware and computer program elements of the computer 100. The client computer 132 may also comprise additional elements not illustrated for the computer 100. The client computer 132 may comprise a user interface controller 156 that manages a user interface presented or displayed via a user I/O device 121 that is connected to or contained within the client computer 132.

FIG. 1 is intended to depict the representative major components of the computer system 100, the network 130, and the client computer 132. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the computer system 100 and that, when read and executed by one or more processors in the computer system 100 or when interpreted by instructions that are executed by one or more processors, cause the computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, radio frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

FIG. 2 depicts a block diagram of an example program 152, according to an embodiment of the invention. The program 152 comprises instructions that execute on the processor 101, statements that are interpreted by instructions that execute on the processor 101, or statements that are compiled into instructions that execute on the processor. The program 152 comprises statements, instructions, or references to variables 202, 204, 206, 208, 210, and 212, which when executed on the processor read data values from or write data values to respective locations at addresses in the memory 102 that represent the respective variables 202, 204, 206, 208, 210, and 212.

FIG. 3 depicts a block diagram of an example data structure for an address watch table 158, according to an embodiment of the invention. The address watch table 158 comprises example records 302, 304, and 306, each of which comprises a example thread identifier field 310, and example variable name field 312, and an example address watched field 314. The thread identifier 310 identifies a thread 154 that is halted and that set an address watch, while halted, of the variable 312 whose contents are stored at the address 314, in the same record. The variable 312 specifies a name of variable located at the address 314 that is being watch or monitored for modification of the contents of the variable at the location of the address watched 314, in the same record. The address watched field 314 specifies an address of a location in the memory 102 that the debug engine 150 watches or monitors, via a processor instruction, for contents modification.

An address watch monitors a memory location and halts execution of a thread of the program 152 in response to the execution of the thread modifying, updating, or writing to the contents of that memory location. The debug engine 150 initiates an address watch by specifying a memory address to an address watch function of the processor 101 while a thread of the program 152 is halted. After the debug engine 150 sets the address watch on a specified memory address via the processor 101, the user provides an input to a debug user interface, in response to which the debug engine 150 resumes execution of the thread of the program 152. In response to the execution of a thread of the program 152 eventually modifying the contents of the monitored memory location, the processor 101 issues a system exception or interrupt, which halts execution of the thread of the program that modified the contents of the monitored location and gives control of the processor 101 to the debug engine 150. The debug engine 150 then performs the processing as further described below with reference to FIG. 6. An address watch is not thread specific, meaning that any thread 154 may potentially modify the contents of the watched memory location, encounter the address watch, and halt.

As illustrated in FIG. 3, using the example program 152 of FIG. 2, the debug engine 150 set an address watch on the variable X 202 at the address "00FF" in the memory 102, on the variable Y 204 at the address "0104" in the memory 102, and on the variable Z 206 at the address "FEE9" in the memory 102. The debug engine 150 sets all of the address watches while the thread 154 identified by the thread identifier 310 of "thread A" was halted. The debug engine 150 did not set an address watch on the variables 208, 210, and 212.

An address watch is in contrast to a breakpoint. While execution of a thread 154 of the program 152 is halted, the debug engine 150 sets breakpoints in the program 152. The debug engine 150 sets breakpoints, e.g., by replacing a valid statement or instruction at a breakpoint location in the program 152 with an invalid instruction and by creating a record for the breakpoint in a breakpoint management table. After the breakpoints are set, the debug engine 150 resumes execution of the thread 154 of the program 152. In response to the execution of a thread 154 of the program 152 eventually encountering the invalid statement or instruction, a system exception or interrupt occurs, which halts execution one of the threads 154 of the program 152 (via a technique known as non-stop-debugging) and gives control of the processor 101 to the debug engine 150. The debug engine 150 then performs processing before resuming execution of the thread of the program 152.

Figure 4:
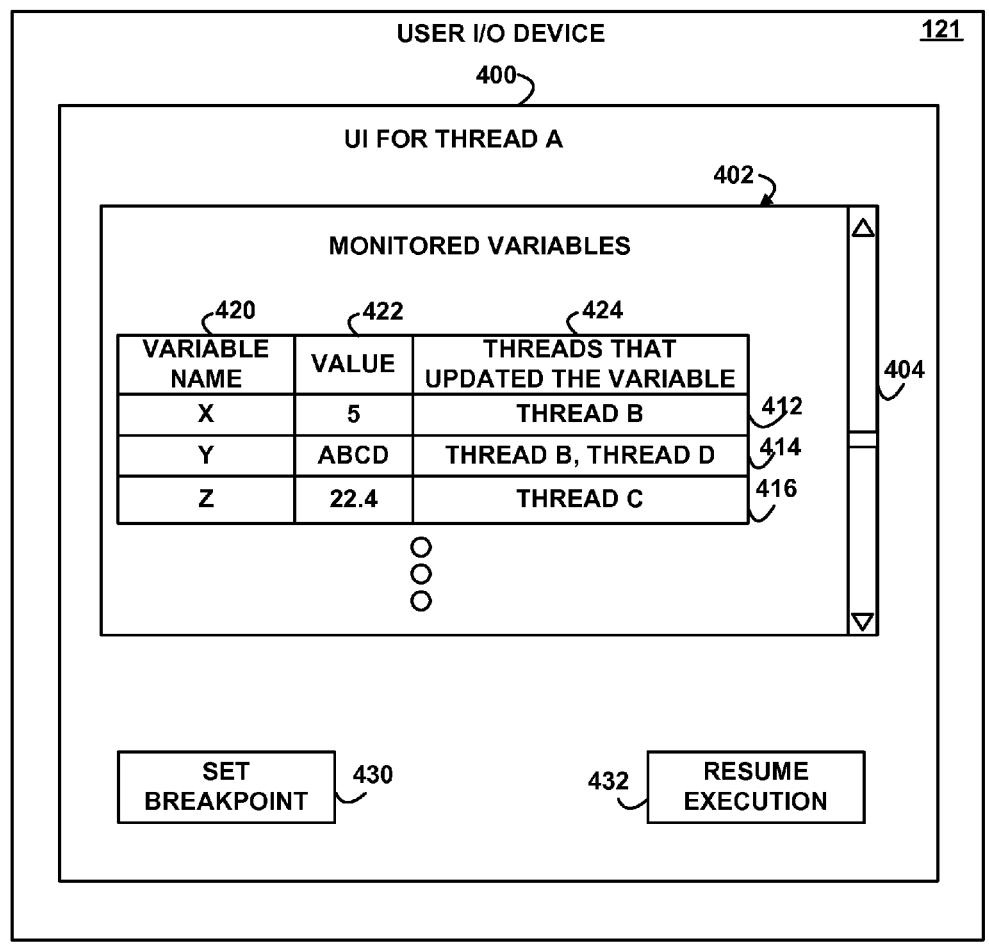
FIG. 4 depicts a block diagram of an example user interface presented via a user I/O (Input/Output) device, according to an embodiment of the invention.

FIG. 4 depicts a block diagram of an example user interface 400 presented via a user I/O (Input/Output) device 121, according to an embodiment of the invention. The user interface 400 is for the thread A, which is one of the threads 154 of the program 152, and the execution of the thread A is currently halted. The user interface 400 comprises monitored variables 402, which are variables that were accessed or referenced by the halted thread A when the halted thread A was executing. In an embodiment, each thread 154 that halts has its own user interface that displays the status of that thread 154, including the values of variables that were accessed by that thread 154. In an embodiment, the variables depicted in the monitored variables 402 are global to threads 154 and may be accessed by some or all of the threads 154. In an embodiment, the variables are local to a procedure, method, routine, module, sub-procedure or subroutine, or other unit of the halted thread A that was executing when the thread A halted and are not accessed by the thread A outside the unit of the halted thread A that was executing at the time that the thread A halted.

The monitored variables 402 comprises any number of records 412, 414, and 416, each of which comprises a variable name field 420, a value field 422, and a threads field 424. The variable name field 420 identifies the name or other identifier of the variable within the program 152, for which the debug engine 150 has established an address watch. The value field 422 specifies contents of the variable 420, in the same record. The threads field 424 identifies the thread that updated or modified the value 422 of the variable 420 in the same row while the thread A is halted. The monitored variables 402 are displayed within a window that comprises a scrollbar 404. By operation of the scrollbar 404 via the user I/O device 121, the user may request that the records 412, 414, and/or 416 be scrolled up or down, which may causes some or all of the records 412, 414, and/or 416 to be scrolled out of the display area of the monitored variables 402, so that they are no longer viewable, and other rows representing other variables, their values, and the threads that updated those values to become visible.

For example, the records 412, 414, and 416, representing respective variables X 202, Y 204, and Z 206 are currently visible in the monitored variables 402, but rows representing the variables R 208, Q 210, and L 212 are not currently visible in the monitored variables 402. But, if the user operates the scroll bar 404 to scroll up or down, rows representing the variables R 208, Q 210, and L 212 may become visible while some or all of the records 412, 414, and 416 become no longer visible.

Although the user interface 400 depicts the scrollbar 404, in other embodiments, the user interface 400 may provide page up or page down buttons or commands, a speech recognition function, or any other user interface technique for scrolling the contents of the monitored variables 402. The user interface 400 further comprises commands, such as the set breakpoint command 430 and the resume execution command 432. The selection of the respective command 430 or 432 via the user I/O device 121 sends the respective command to the debug engine 150 via the user interface controller 156 and requests that the debug engine 150 set a breakpoint at a specified instruction or statement address in the program 152 or requests that the debug engine 150 resume execution of the halted thread A of the program 152. Although the commands 430 and 432 are illustrated in FIG. 4 as buttons, in other embodiments, they may be textual commands entered via a command line, menu options, or commands entered via a speech recognition system.

Figure 5:
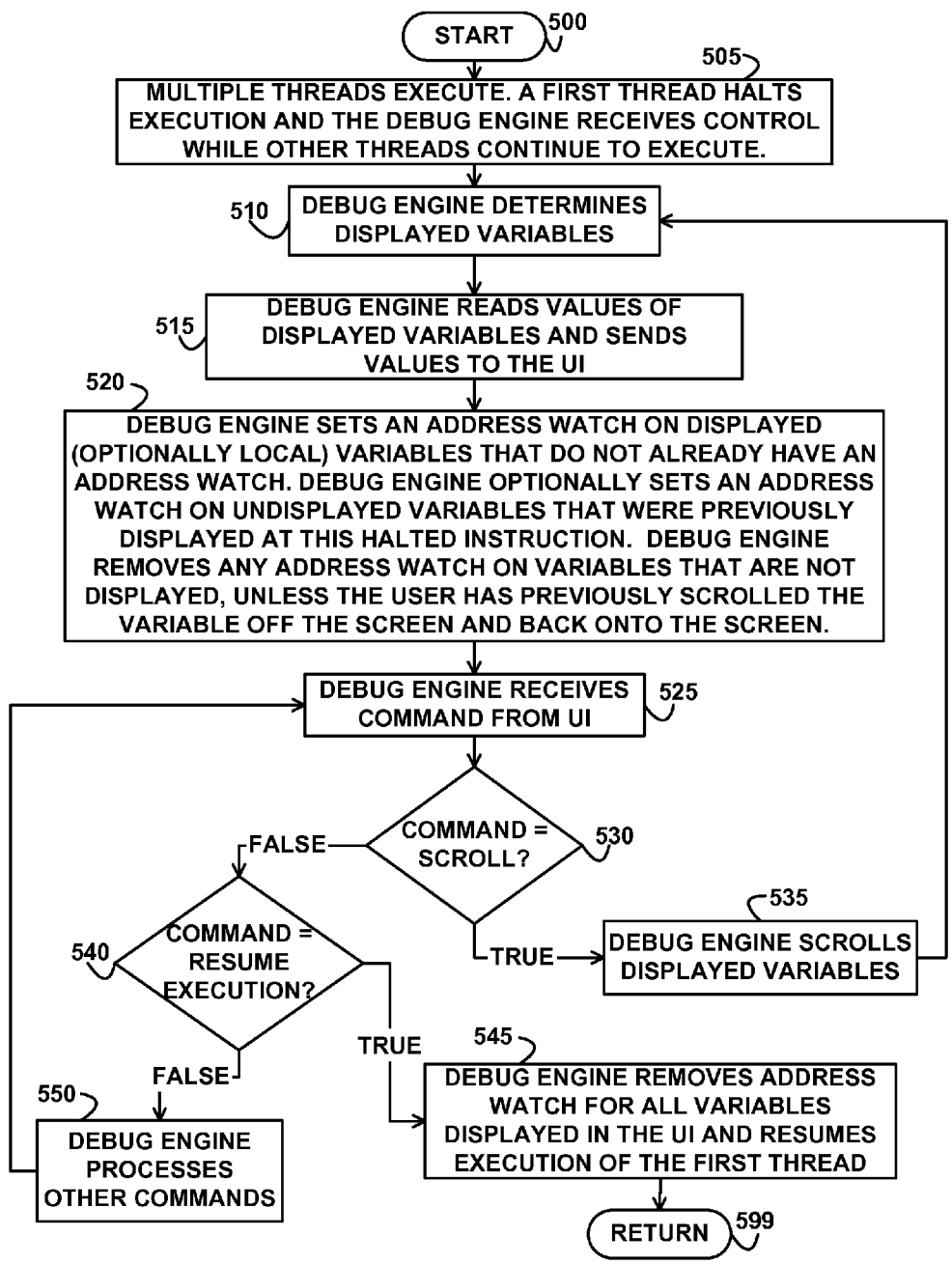
FIG. 5 depicts a flowchart of example processing for setting address watches, according to an embodiment of the invention.

FIG. 5 depicts a flowchart of example processing for setting address watches, according to an embodiment of the invention. Control begins at block 500. Control then continues to block 505 where multiple of the threads 154 execute on the processor 101. A first thread halts execution, and the debug engine 150 receives control of the processor while other of the threads 154 continue executing. The first thread may halt because the first thread encountered a breakpoint or because a system exception occurred.

Control then continues to block 510 where the debug engine 150 determines the variables 420 that are displayed in the monitored variables 402 on the user I/O device 121 in the user interface 400 of the halted first thread. In various embodiments, the debug engine 150 may determine the displayed variables by finding and displaying all variables local to the procedure (or other unit of a thread 154) that was executing in the halted first thread, by receiving a specification of the variables to display from the user via the user I/O device 121 or by receiving a specification of the variables that are displayed from the user interface controller 156 that manages the user interface. Control then continues to block 515 where the debug engine 150 reads values of the displayed variables from the memory allocated to the halted first thread or from the memory allocated to all threads 154 of the program 152 and sends the values to the user I/O device 121 or to the user I/O device 121 via the user interface controller 156, where the values are displayed in the monitored variables 402 of the user interface 400 of the halted first thread, as the values 422.

Control then continues to block 520 where the debug engine 150 sets or establishes an address watch on displayed (optionally local) variables that do not already have an address watch. The debug engine 150 optionally also sets an address watch on un-displayed variables that were previously displayed at this halted instruction. The debug engine 150 removes any address watch on variables that are not displayed, unless the user has previously issued a command that scrolled the variable off the visible portion of the screen and then back onto the visible portion of the screen. In an embodiment, if the addresses of displayed variables are close to each other (within a threshold range of each other), the debug engine 150 sets an address watch on all variables whose addresses are within the threshold range, even if some of the variables within the range are not displayed.

Control then continues to block 525 where the debug engine 150 receives a command from the user interface of the halted first thread. Control then continues to block 530 where the debug engine 150 determines whether the received command is a scroll command that requests a change to the display of the variables on the user interface, either one or more displayed variables no longer being displayed, one or more variables that previously were not displayed to be displayed, or both. In an embodiment, the user interface controller 156 receives the scroll command, scrolls the displayed variables, and informs the debug engine 150 of the variables that are displayed.

If the determination at block 530 is true, then the command is a scroll command that changes the display of the variables, so control continues to block 535 where the debug engine 150 scrolls the displayed variables (or the user interface controller 156 scrolls the displayed variables), which may cause some or all of the displayed variables to no longer be displayed and/or cause some non-displayed variables to become displayed and viewable. Control then returns to block 510 where the debug determines the newly displayed variables, as previously described above.

If the determination at block 530 is false, then the received command is not a scroll command that changes the display of the variables that are viewable, so control continues to block 540 where the debug engine 150 determines whether the received command is a request to resume execution of the halted first thread. If the determination at block 540 is true, then the received command is a request to resume execution of the halted first thread, so control continues to block 545 where the debug engine 150 removes the address watch for all variables that are displayed and visible in the user interface and resumes execution of the first thread that was halted. Control then continues to block 599 where the logic of FIG. 5 returns.

If the determination at block 540 is false, then the received command is not a request to resume execution of the halted first thread, so control continues to block 550 where the debug engine 150 processes other commands. Control then returns to block 525 where the debug engine 150 receives another command, the same or different command as before, from the user I/O device 121 or the user interface controller 156, as previously described above.

Figure 6:
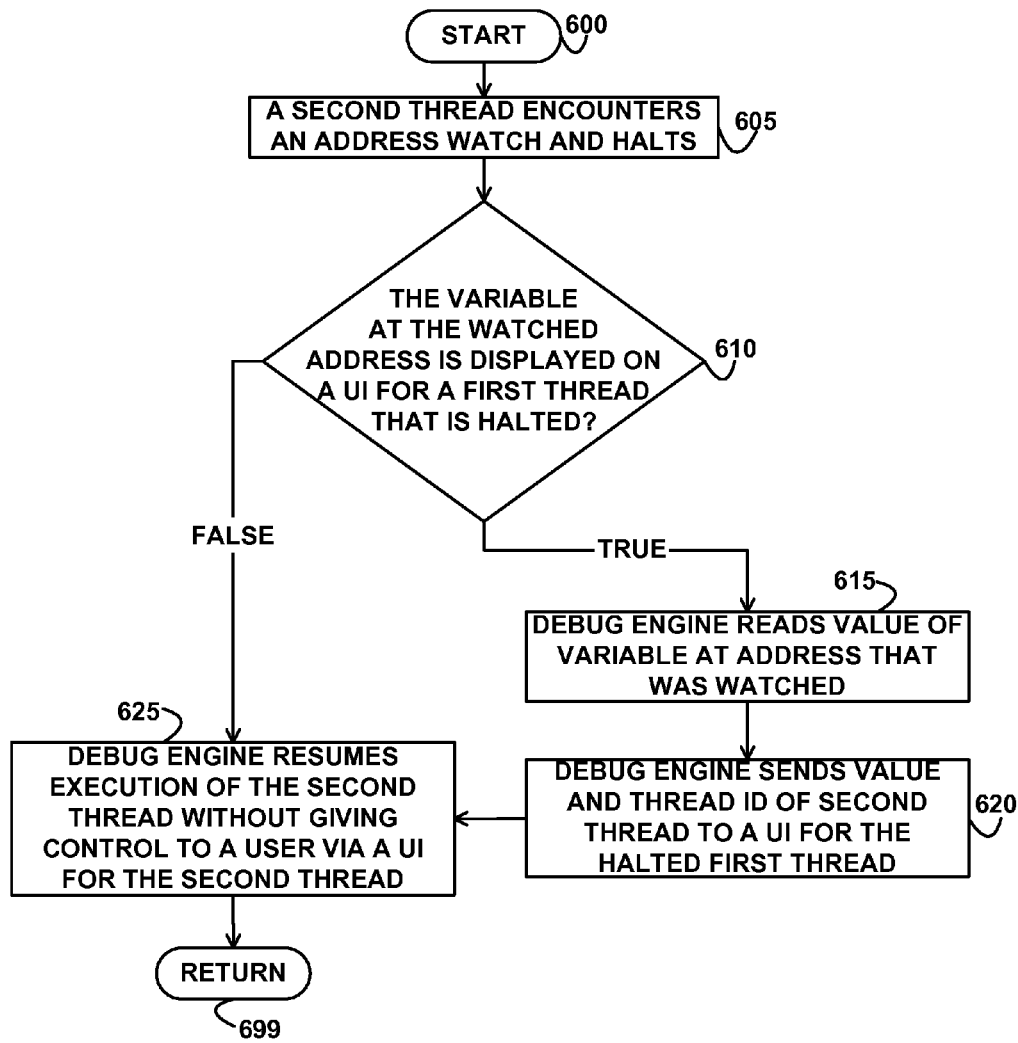
FIG. 6 depicts a flowchart of example processing for encountering an address watch, according to an embodiment of the invention.

FIG. 6 depicts a flowchart of example processing for encountering an address watch, according to an embodiment of the invention. The logic of FIG. 6 executes concurrently, substantially concurrently, or interleaved with the logic of FIG. 5. Control begins at block 600. Control then continues to block 605 where a second thread (different from the first halted thread of FIG. 5) encounters an address watch and halts. That is, the second thread executed an instruction that modified the contents at the location of the memory address that was monitored by the address watch. The address watch does not cause the halting of other of the threads 154 that did not encounter the address watch. Control then continues to block 610 where the debug engine 150 determines whether the variable located at, or that represents, the watched address that encountered the address watch is displayed and visible on the user interface for the halted first thread.

If the determination at block 610 is true, then the variable located at the watched address is displayed on the user interface and visible on the user interface for the halted first thread, so control continues to block 615 where the debug engine 150 reads the value of that variable at that address that was watched by the address watch. Control then continues to block 620 where the debug engine 150 sends the value and thread identifier of the second thread to the user interface for the halted first thread, which displays the value and thread identifier of the second thread in the value field 422 and the thread field 424, respectively, in the same record as the variable field 420 that matches the variable that represents the memory location watched by the address watch. Control then continues to block 625 where the debug engine 150 resumes execution of the second thread without giving control to a user via a user interface for the second thread. Thus, a user viewing the user I/O device 121 is unaware that the second thread halted. Control then continues to block 699 where the logic of FIG. 6 returns.

If the determination at block 610 is false, then the variable located at, or that represents, the watched address is not displayed and visible on the user interface 400 for the halted first thread, so control continues to block 625 where the debug engine 150 resumes execution of the second thread without giving control to a user via a user interface for the second thread and without reading a value of the variable at the address that was watched and without sending any value to a user interface of the halted first thread. Thus, a user viewing the user I/O device 121 is unaware that the second thread halted. In an embodiment, the variable located at the watched address is not displayed on the user interface for the halted first thread because the variable was scrolled off of the display area of the monitored variables 402. Control then continues to block 699 where the logic of FIG. 6 returns.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention.

In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention. Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:

1. A method comprising:
   halting execution of a first thread of a plurality of threads of a program while one or more other threads of said plurality of threads of said program continue to execute, each thread of said plurality of threads concurrently executing in a computer system;
   while the execution of said first thread is halted while one or more other threads of said plurality of threads of said program continue to execute, displaying a user interface for said first thread using said computer system, said user interface including at least one variable of said program;

while the execution of said first thread is halted while one or more other threads of said plurality of threads of said program continue to execute, determining a set of at least one variable of said program displayable in said user interface, and responsive thereto, establishing an address watch on each memory address represented by a variable of said set of at least one variable of said program, including a first memory address represented by a first variable in sad program;

in response to a second thread of said plurality of threads modifying memory contents at the first memory address while execution of said first thread is halted while one or more other threads of said plurality of threads of said program continue to execute, the second thread being among said one or more other threads of said plurality of threads of said program which continue to execute, encountering the address watch corresponding to said first memory address and, responsive to the encountered address watch, halting the second thread and determining whether said first variable is displayed on said user interface for the first thread;

if responsive to determining that said first variable is displayed on the user interface for the first thread, reading the value of the first variable and displaying the value for the first variable as modified by the second thread on the user interface for the first thread;

if responsive to determining that said first variable is not displayed on the user interface for the first thread, resuming execution of the second thread without reading the value of the first variable, without giving control to a user interface of the second thread, and without displaying the value for the first variable on the user interface for the first thread;

and wherein while execution of the first thread is halted, in response to detecting that a second variable that was previously displayed on said user interface for said first thread is currently not displayed on said user interface for said first thread, an address watch on a second memory address represented by the second variable is removed unless the second variable was previously removed from view and returned to view on said user interface.

2. The method of claim 1, further comprising:
displaying on the user interface of the first thread a thread identifier of the second thread that modified the memory contents at the first memory address.

3. The method of claim 1, wherein the establishing the address watch on each memory address represented by a variable of said set of at least one variable of said program while the execution of the first thread is halted further comprises:
establishing the address watch if the first variable that represents the first memory address is displayed in the user interface of the first thread.

4. The method of claim 1, wherein the establishing the address watch on each memory address represented by a variable of said set of at least one variable of said program while the execution of the first thread is halted further comprises:
establishing the address watch if the first variable that represents the first memory address is not displayed in the user interface of the first thread and the variable was previously displayed in the user interface while the first thread is halted.

5. The method of claim 1, further comprising:
in response to a command that requests resuming execution of the first thread, removing the address watch on the first memory address.

6. The method of claim 1, further comprising:
while execution of said first thread is halted while one or more other threads of said plurality of threads of said program continue to execute, in response to detecting that a second variable that was previously displayed on said user interface for said first thread is currently not displayed on said user interface for said first thread, removing an address watch on a second memory address represented by the second variable.

7. A non-transitory computer-readable storage medium encoded with instructions, wherein the instructions when executed comprise:
halting execution of a first thread of a plurality of threads of a program while one or more other threads of said plurality of threads of said program continue to execute, each thread of said plurality of threads concurrently executing in a computer system, wherein a user interface for said first thread is displayed while the execution of said first thread is halted while one or more other threads of said plurality of threads of said program continue to execute, said user interface including at least one variable of said program;

while the execution of said first thread is halted while one or more other threads of said plurality of threads of said program continue to execute, determining a set of at least one variable of said program displayable in said user interface, and responsive thereto, establishing an address watch on each memory address represented by a variable of said set of at least one variable of said program, including a first memory address represented by a first variable in said program, said set including each variable that is displayed in said user interface for the first thread;

in response to a second thread of said plurality of threads modifying memory contents at the first memory address while execution of said first thread is halted while one or more other threads of said plurality of threads of said program continue to execute, the second thread being among said one or more other threads of said plurality of threads of said program which continue to execute, encountering the address watch corresponding to said first memory address and, responsive to the encountered address watch, halting the second thread and determining whether said first variable is displayed on said user interface for the first thread;

responsive to determining that said first variable is displayed on the user interface for the first thread, reading the value of the first variable and displaying the value for the first variable as modified by the second thread on the user interface for the first thread;

responsive to determining that said first variable is not displayed on the user interface for the first thread, resuming execution of the second thread without reading the value of the first variable, without giving control to a user interface of the second thread, and without displaying the value for the first variable on the user interface for the first thread;

and wherein while execution of the first thread is halted, in response to detecting that a second variable that was previously displayed on said user interface for said first thread is currently not displayed on said user interface for said first thread, an address watch on a second memory address represented by the second variable is removed unless the second variable was previously removed from view and returned to view on said user interface.

8. The non-transitory computer-readable storage medium of claim 7, further comprising:
  displaying on the user interface of the first thread a thread identifier of the second thread that modified the memory contents at the first memory address.

9. The non-transitory computer-readable storage medium of claim 7, wherein the establishing the address watch on each memory address represented by a variable of said set of at least one variable of said program while the execution of the first thread is halted further comprises:
  establishing the address watch if the first variable that represents the first memory address is not displayed in the user interface of the first thread and the variable was previously displayed in the user interface while the first thread is halted.

10. The non-transitory computer-readable storage medium of claim 7, further comprising:
  in response to a command that requests resuming execution of the first thread, removing the address watch on the first memory address.

11. The non-transitory computer readable storage medium of claim 7, further comprising:
  while execution of said first thread is halted while one or more other threads of said plurality of threads of said program continue to execute, in response to detecting that a second variable that was previously displayed on said user interface for said first thread is currently not displayed on said user interface for said first thread, removing an address watch on a second memory address represented by the second variable.

12. A computer comprising:
  a processor;
  and memory communicatively coupled to the processor, wherein the memory is encoded with instructions, wherein the instructions when executed on the processor comprise:
  halting execution of a first thread of a plurality of threads of a program while one or more other threads of said plurality of threads of said program continue to execute, each thread of said plurality of threads concurrently executing in a computer system, wherein a user interface for said first thread is displayed while the execution of said first thread is halted, said user interface including at least one variable of said program;
  while the execution of said first thread is halted while one or more other threads of said plurality of threads of said program continue to execute, determining a set of at least one variable of said program displayable in said user interface, and responsive thereto, establishing an address watch on each memory address represented by a variable of said set of at least one variable of said program, including a first memory address represented by a first variable in said program, said set including each variable that is displayed in said user interface for the first thread;
  in response to a second thread of said plurality of threads modifying memory contents at the first memory address while execution of said first thread is halted while one or more other threads of said plurality of threads of said program continue to execute, encountering the address watch corresponding to said first memory address and, responsive to the encountered address watch, halting the second thread and determining whether said first variable is displayed on said user interface for the first thread;
  if responsive to determining that said first variable is displayed on the user interface for the first thread, reading the value of the first variable and displaying the value for the first variable as modified by the second thread on the user interface for the first thread;
  if responsive to determining that said first variable is not displayed on the user interface for the first thread, resuming execution of the second thread without reading the value of the first variable, without giving control to a user interface of the second thread, and without displaying the value for the first variable on the user interface for the first thread;
  and wherein while execution of the first thread is halted, in response to detecting that a second variable that was previously displayed on said user interface for said first thread is currently not displayed on said user interface for said first thread, an address watch on a second memory address represented by the second variable is removed unless the second variable was previously removed from view and returned to view on said user interface.

13. The computer of claim 12, wherein the instructions further comprise:
  displaying on the user interface of the first thread a thread identifier of the second thread that modified the memory contents at the first memory address.

14. The computer of claim 12, wherein the establishing the address watch on each memory address represented by a variable of said set of at least one variable of said program while the execution of the first thread is halted further comprises:
  establishing the address watch if the first variable that represents the first memory address is not displayed in the user interface of the first thread and the variable was previously displayed in the user interface while the first thread is halted.

15. The computer of claim 12, wherein the instructions further comprise:
  in response to a command that requests resuming execution of the first thread, removing the address watch on the first memory address.

16. The computer of claim 12, wherein the instructions further comprise: while execution of said first thread is halted while one or more other threads of said plurality of threads of said program continue to execute, in response to detecting that a second variable that was previously displayed on said user interface for said first thread is currently not displayed on said user interface for said first thread, removing an address watch on a second memory address represented by the second variable.

* * * * *